Dec. 16, 1941.    R. D. CLEMSON    2,266,308
MOWER
Filed Feb. 14, 1939    3 Sheets-Sheet 1
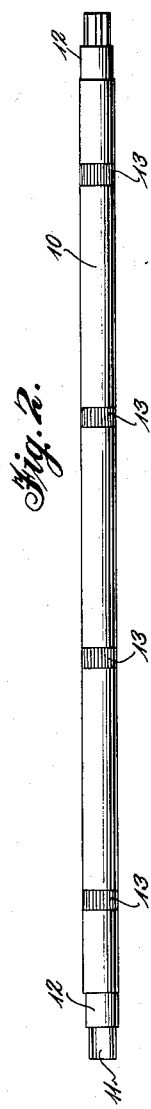
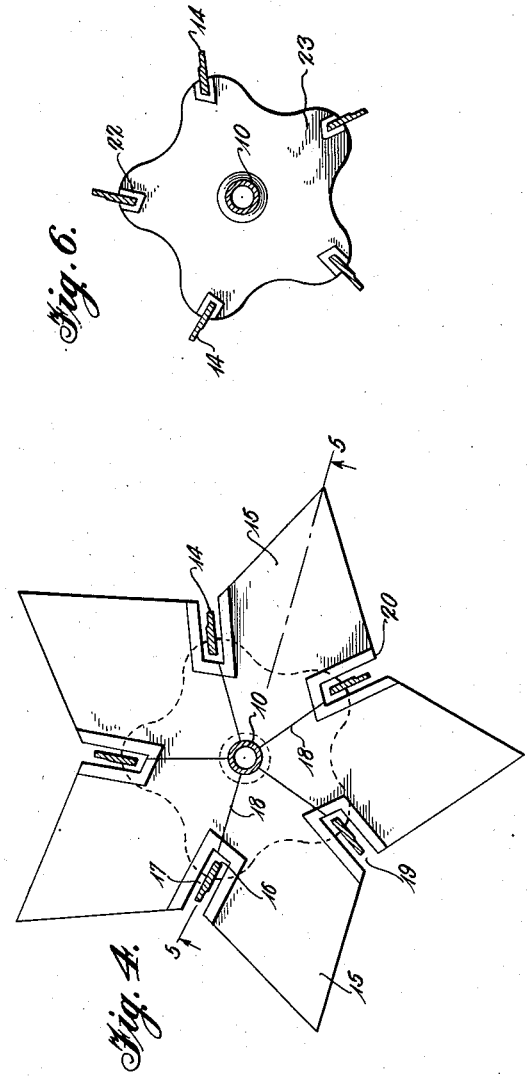
Inventor
Richard D. Clemson
By Newell, Spencer & Safford
Attorneys

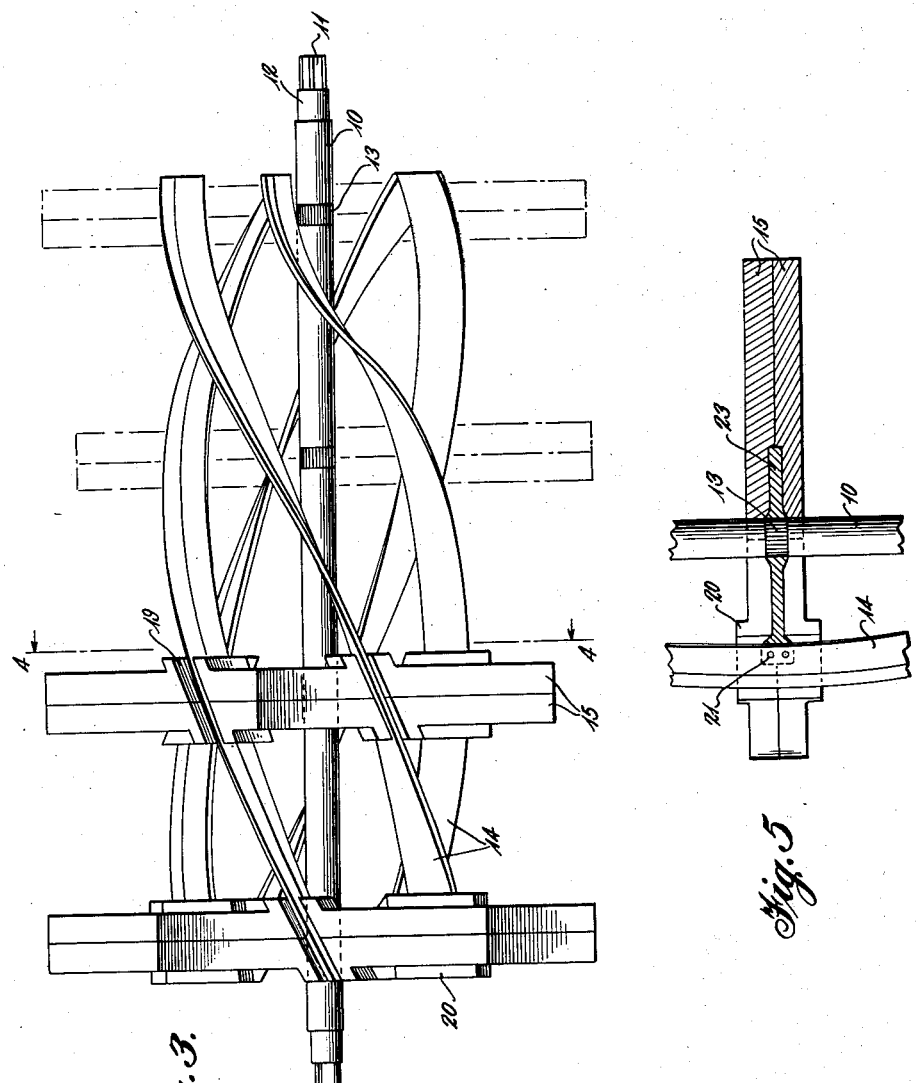

Dec. 16, 1941.  R. D. CLEMSON  2,266,308
MOWER
Filed Feb. 14, 1939  3 Sheets-Sheet 3

Inventor
Richard D. Clemson
By
Attorneys

Patented Dec. 16, 1941

2,266,308

UNITED STATES PATENT OFFICE 2,266,308

MOWER

Richard D. Clemson, Middletown, N. Y., assignor to Clemson Bros., Inc., Middletown, N. Y., a corporation of New York Application February 14, 1939, Serial No. 256,381

4 Claims. (Cl. 56—294)

This invention relates to a novel method of fabricating a rotary cutting reel for lawn mowers in a rapid and economical manner from low cost materials which insures that the finished reel shall be accurately formed and relatively immune to distortion by accidental shocks normally incident to conventional use of the machine in which the reel is employed.

In lawn mowers of the rotary cutting reel type as known prior to the invention disclosed in my copending application now Patent No. 2,185,833, the reel was manufactured from a plurality of preformed spiral fly knives by riveting the knives to preformed spiders attached to a rod-like axle. Such reels are intended to be mounted on side frame members between ground wheels to which the reel axle is operatively connected by a gear train or chain and sprocket type transmission. A bed knife is also mounted on the side frame members in such a manner that the cutting edge thereof is in contact with the fly knives. The cutting mechanism therefore consists of a generally cylindrical reel having a plurality of spiral fly knives disposed with their cutting edges lying in a common geometric cylinder roughly concentric with the axle and a bed knife with its edge in contact with said cylinder and parallel to said axle.

It will be clear that upon rotation of the cutting reel the fly knives will make progressive shearing contact with the bed knife from one end to the other. The reasons for desiring that the edges of the fly knives shall lie in a nearly perfect geometric cylinder are obvious. The straight line bed knife edge, positioned in a more or less definite relation to the rest of the mechanism must make shearing contact with the whole length of each fly knife for best results. It has been common practice to depend upon grinding of the fly knife edges to impart a proper cylindrical outline to the reel. However, it is readily seen that strains set up in the reel assembly will tend to distort the same during usage, especially if the machine strikes obstructions or if matter not capable of being cut, such as wire, sticks, stones and the like, is caught between the shearing knives.

During the operations of forming, forging and tempering a fly knife, a large number of deviations from a true spiral are introduced into the blade structure. The blades are then rigidly fixed to predetermined points on a spider rigidly positioned on an axle. While it is relatively easy to make a fly knife to conform to two points determined in advance, a majority of the mowing machines now marketed are fitted with more than two spiders in order to provide proper support along the entire length of the fly knives. The cutting reels now in general use are made by springing the fly knives to a material extent in order to force a fit with the rigid spiders. This sets up stresses in the reel assembly to such an extent that the elastic limit of the metal used is approached and leaves little or no resiliency to compensate for strains applied to the reel during usage. A shock applied to one of these knives of reduced resiliency may readily cause permanent distortion thereof with consequent inefficient operation.

A further difficulty is encountered by reason of the fact that it is difficult to fabricate a truly straight axle for the reel at a reasonable cost. Slight deviations in the axle or irregularities in its surface will result in displacement of the spiders positioning the points for attachment of the fly knives out of the predetermined spiral relationship. The inaccuracies in the blades and in the positions of the spiders may in some cases tend to compensate for each other but it is equally likely that their effect will be additive. As disclosed in my copending application, these difficulties may be overcome and the reel formed with the fly knife edges in a true geometric cylinder by placing the knives and axle in a mold in the relative positions they are to have in the finished reel, and thereafter casting the spiders in contact with the knives and axle.

I have found that this procedure results in a reel which is free from strain and in which the fly knives are properly positioned. This reel is very well suited to known types of lawn mowers using a rotary cutting reel which forms shearing contact with a bed knife.

It is a primary object of this invention to adapt the process disclosed in the said application to the type of lawn mower in which an overrunning clutch element is mounted at the end of the axle. Most mowing machines now use such a drive whether the connection to the driving wheels be a gear train or a sprocket. The ends of the axle are journaled in the end frame members and carry keys by means of which they are driven. Accurate formation and placing of the bearing portions and keys are important to efficient operation, since if any of these is out of line, the reel will be rotated about an axis other than the true center of the geometric cylinder noted above, causing undue clashing of the knives and difficult operation.

Accordingly it is an object of this invention to provide a process of forming a rotary cutting reel including the driving members attached thereto which will remain in proper adjustment.

Another important object of the invention is the provision of a process whereby an accurately formed reel may be fabricated of low cost materials.

With these and other objects in view my invention contemplates manufacture of a reel in which the flyknives are free from strain and properly spaced about an axis determined by the driving members forming a part thereof. This is accomplished by determining the relation and relative points of attachment by reference to the nature of the fly knives, driving members and axle themselves. Thus, instead of fitting the fly knives into slots or riveting them onto ears of a preformed spider rigidly positioned on a preformed axle, as has been done in the prior art, the axle is fitted with driving members which act as centers to determine the axis thereof, placed in a fixed position with respect to preformed fly knives arranged thereabout in the relation they are intended to have in the finished reel. Thereafter the spiders are secured to the axle and fly knives, according to my invention, by fusion or molding onto and around the fly knives and axle while the material of which the spider is formed is in a plastic or fluid condition so that it does not cause a strain or displacement of the individual fly knives with respect to the reel as a unit. Each spider is a rigid element of the reel taking its general form from a mold or the like and its points of attachment to axle and knives from the shape and arrangement of those parts.

Obviously, if the spiders are in the form of relatively thin slotted discs or similar members not more than two of these may be preformed, since regardless of the form of the knives they will adjust themselves to any two fixed points without introducing strain into the knife itself. I have found, however, that almost any mechanical fastening which gives sufficient rigidity of engagement between the spider and the fly knife at two points will have sufficient breadth so that it is likely to introduce some appreciable strain. I, therefore, form at least all but one and advantageously and preferably all of the spiders by casting, molding, welding in situ, or other process by which the point of fastening is determined accurately and freely by the fly knife itself and without the necessity of conforming its shape to any preformed member.

In the accompanying drawings I have shown a preferred embodiment of my invention. It is to be understood that this is not intended to be either exhaustive or limiting of the invention, but on the contrary is chosen for the purposes of illustrating the invention, in order that others skilled in the art may so fully understand the invention, its principles and the application thereof that they may embody it and adapt it in numerous forms, each as may be best suited to the requirements of its particular use.

A series of steps in the process of this invention are represented by illustrations of the products of those steps in the drawings, wherein:

Figure 1 is an exploded perspective view of the axle showing the clutch elements intended for each end thereof;

Figure 2 represents the assembled axle prepared for attachment of the fly knives;

Figure 3 shows the axle and fly knives arranged in proper relation in a mold for casting the spiders;

Figure 4 is a sectional view on line 4—4 of Fig. 3;

Figure 5 represents a section on line 5—5 of Fig. 4;

Figure 6 is a sectional view of the finished reel taken at right angles to the axle;

Figure 7:
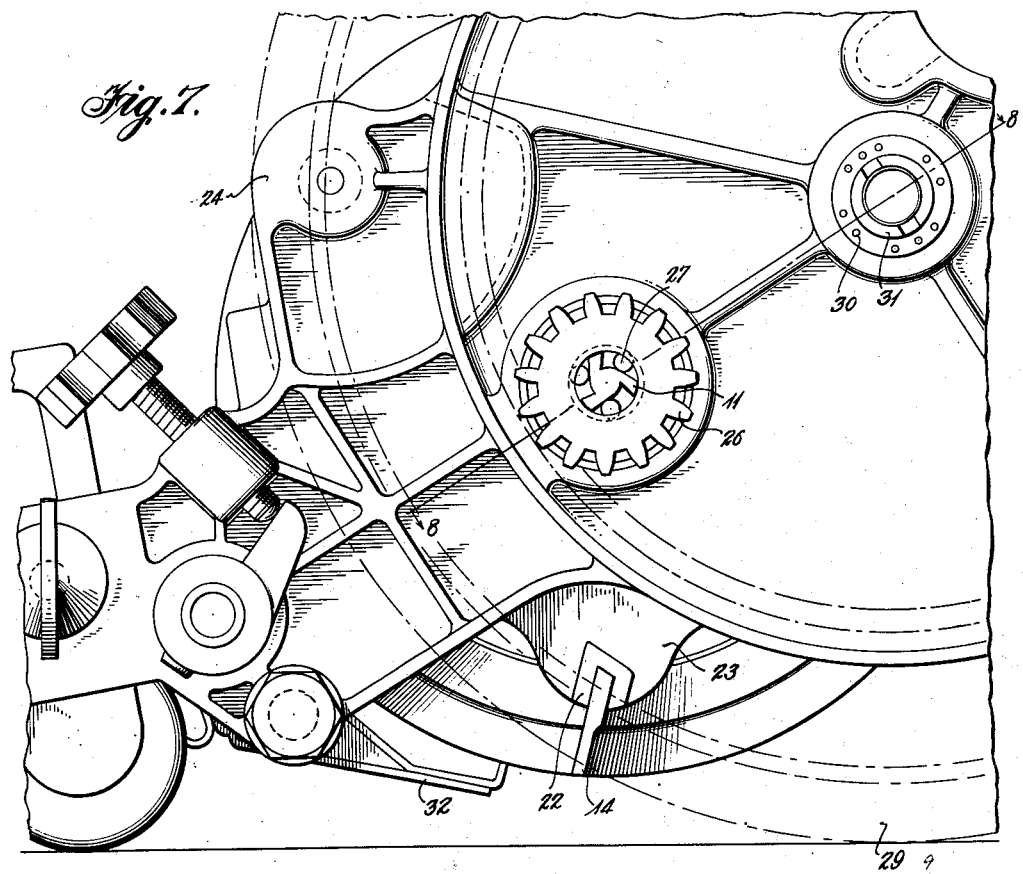
Figure 7 is an end elevation of an assembled lawn mower employing a reel which embodies the principles of this invention, the wheel being illustrated in broken lines to show the mounting of the reel axle.

Referring particularly to Fig. 1, the axle of the reel comprises a metallic tube 10 and two clutch members 11. One extremely important advantage of this invention lies in the fact that tube 10 need not be formed with particular attention to accuracy. As pointed out above, the reels employed in the prior art required that the axle be accurately fabricated in order that the points of attachment for the fly knives be properly positioned upon affixation of the spiders. Due to the manner in which the axle is centered and to the manner of forming the spiders the present axle may be a rough tube of the type commonly sold on the market as ⅝ inch outside diameter pipe having a wall thickness of about $\frac{1}{16}$ to $\frac{3}{32}$ inch. It will be apparent as the present discussion proceeds that the strength of the tube need not be unusually high for such pipe, inasmuch as the reel spiders and fly knives are very strong though light in weight. This feature permits the use of a hollow axle and avoids a substantial amount of weight heretofore required. The preferred material used for the axle is that known as a rough stock tube.

The clutch members 11 are driven a substantial distance into the ends of the tube 10 by any suitable means; for example, the tube may be clamped in a vise and the member 11 driven by blows of a mallet or pressed in by any convenient method and apparatus. The distance to which the clutch member penetrates the tube tends to compensate for any inequalities in the interior of the tube. The axes of the clutch members will be brought into line on the general axis of the tube by this method. It will be understood, of course, that the clutch members are hard forged steel and will readily cut the interior surface of the relatively soft metal tube, aligning and rigidly positioning the said members during the driving step.

The tube is then mounted in a lathe or the like, using the clutch members to center the rotation of the tube on the machine, and bearing surfaces 12 are cut at the ends of the tube. It is significant that the shoulder formed by cutting the bearing surface is of varying width. The differences in width of the shoulder are, in general, easily apparent to the unaided eye, indicating that the rough stock tube was originally inaccurate to a substantial degree. The effect of such inaccuracy is completely overcome by using the accurately machined clutch members to center the axle on the lathe.

A number of bands about the tube, corresponding to the number of spiders to be formed, are roughened, checked or knurled, as at 13, to provide a surface peculiarly adapted to make a firm joint between the axle and the spiders. This operation is advantageously performed while the axle is mounted in the lathe, although it will be apparent that this may be accomplished in any other suitable manner since proper centering of these bands is not of material importance as will appear from the following description of the manner in which the spiders are formed.

Referring particularly to Figs. 3 to 6, it will be noted that a plurality of fly knives 14 (five in the embodiment shown here) are disposed in spaced relationship about the tube 10. For the purpose of aligning the knives in angular relationship about the axle, I regard the centers of the clutch members 11 as defining the center line of the axle. Since the bearing surfaces 12 are true cylinders about that center line, the said surfaces may be used to align the fly knives. The fly knives and axle are mounted in any suitable jig (not shown) or the like which is preferably also adapted to retain the mold sections in position during casting. Having the axle and fly knives in proper relative position, a plurality of mold sections of suitable shape are placed in the jig and secured in position for casting the spiders. Although any suitable type of mold may be employed, superior results are obtained by casting the spiders in the mold shown here and described in my copending application noted above.

The preferred mold comprises a pair of mold sections 15 to be inserted between each two adjacent fly knives. For a five blade reel, ten such sections are required for each spider.

The inner edge 16 of the fly knives 14 forms an angle of not more than 72° with the straight forward face 17, or to put this in another way, the inner edge 16 is parallel to the forward face 17 of the next preceding fly knife 14, or advantageously even diverges from it in a direction away from the shaft. By this relationship the sections 15 of the sectional mold or casting die shown in Figs. 3, 4 and 5 are readily removable in a direction parallel to the face 17 of the adjacent fly knife.

As will be observed from the showing of Fig. 4 the sectional mold in the preferred example is divided along the lines 18, aligned approximately with the respective faces 17 of the fly knives and each section is notched as shown at 19 to fit approximately the cross-section of the fly knife. Although I have said that the line 18 and the notches 19 correspond approximately with the face and dimensions of the respective fly knives it is an important feature of my invention that these are not fitted accurately but leave sufficient clearance to accommodate all normal variations in the form of the fly knives, so that when the fly knives are assembled in this form ready for the molding of the spider there will be no distortion. This leaves gaps between the mold and the fly knives. These gaps are exaggerated in the drawing for better illustration. Ordinarily one or a few hundredths of an inch is ample if the fly knives are carefully made. In order to assure rapid setting of the material being molded if and when it should flow into this gap between the mold and the fly knife, the molds are advantageously provided with relatively massive lateral projections 20 surrounding the notches 19. The mass of these projections when added to the mass of the fly knives themselves is sufficient to congeal by chilling any material which is extruded into the space between the two. Thus this gap is closed and the danger of the material being molded leaking away through the gap is avoided.

With a rapid casting technique and the use of metal dies, it may be necessary to provide for additional cooling of these projections, as for example, by circulation of air over the outside of the die.

The form of the spiders may be varied either for purposes of utility or appearance and may be polygonal or circular and may have cut-out portions to decrease the weight thereof. Steel or other metallic reenforcing elements may be inserted in the mold to increase the strength of the finished spider.

In order to provide strength and a more secure connection between the spider and the fly knives the latter are preferably drilled, as shown at 21 in Fig. 5, or otherwise under-cut in the area which is covered by the spiders, and the spiders themselves are formed with an enlarged portion or boss 22 over the back of each knife. This boss or heavy backing portion 22 serves to take the strain when the fly knife strikes an obstruction and thereby to avoid loosening of the knife and the spider by the repeated impacts.

In the preferred example I have formed the fly knife 14 of forged steel and have drilled each at the surface where it is engaged by the spider (see Fig. 5) and the spiders are cast of aluminum or zinc die-casting metal. The central tube 10 is formed of iron or soft steel and is milled, knurled, squared or fluted at the surfaces 13 where the spiders embrace the axle in order to give a more secure engagement between the shaft and the spiders.

When the mold sections are removed the reel comprises an axle and a plurality of spiral fly knives accurately arranged about an axis defined by the centers of the end portions of the axle and rigidly maintained in position by a plurality of rugged light-weight spiders 23.

Sharpening of the fly knives is accomplished by mounting the reel in a lathe or jig, centered with reference to the clutch members 11 or advantageously the bearing surfaces 12, and grinding the knife edges while rotating the reel about its operative axis. This results in the knife edges lying in a true geometric cylinder, the axis of which is the line of centers of the clutch members 11 and bearing surfaces 12 without regard to the accuracy of the tube 10.

Figure 8:
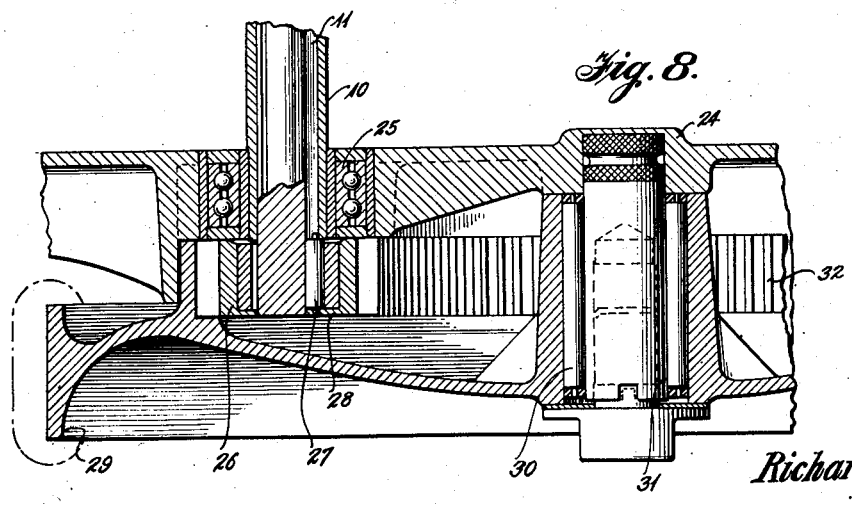
Figure 8 is a partial section on line 8—8 of Fig. 7 with the wheel in full lines.

The importance of centering the reel on the centers of the clutch members 11 will be readily appreciated from a study of Figs. 7 and 8, which illustrate a reel axle mounted in the side frame member 24 of a lawn mower. The bearing surface 12 is carried by the inner ball race of a ball bearing 25 and the end of the clutch member 11 projects into the axial bore of a pinion 26. Rollers 27, retained in the bore by a flange 28, cooperate with clutch member 11 to form an overrunning clutch. When the pinion 26 is rotated in a clockwise direction, the rollers 27 are urged toward the points of least clearance between clutch member 11 and pinion 26, thereby making a positive drive of the axle by the pinion. In this position, the pinion 27 frictionally engages clutch member 11 to such an extent that the axle becomes, in effect, a shaft keyed to the pinion. Counterclockwise rotation of the pinion urges the rollers 27 toward the points of greatest clearance and there is no tendency for pinion 26 to rotate the reel in a reverse direction.

A ground wheel 29, mounted on roller bearings 30 on stub shaft 31 is formed with gear teeth 32 which mesh with pinion 26. Forward motion of the machine will, therefore, cause clockwise rotation of the pinion and drive the cutting reel to make shearing contact with the bed knife. Due to the relatively great strain imposed upon the reel from being positively driven at a rather high speed, it is essential to long life and efficiency of the device that the reel be accurately centered and balanced in the best possible manner. According to prior practice, the fly knives are strained into position and any inequalities are removed by grinding. This results in some knives being wider than others, whereby the reel is unbalanced. By my method of inserting centers in the ends of the axle, which centers are those about which the reel is to rotate in the finished machine, and subsequently positioning the fly knives about the line of those centers, I achieve a dynamically balanced reel capable of long life and high efficiency.

I claim:

1. A cutter reel for rotary mowers which comprises a tubular axle, clutch members of hard metal, each having grooves with floors sloping from the circumference towards the axis and narrow longitudinal ridges with their outermost surfaces accurately formed in a common geometrical surface of revolution the diameter of which, at least at a distance from its ends is slightly greater than that of the interior of the tube between said ridges, said ridges engaging the inside of said tube and distorting the metal thereof to give a driving engagement for transmitting torque, a plurality of fly knives spaced about said tube with their edges ground to a geometric cylinder coaxial with said clutch members, and spiders secured to said tube and engaging the fly knives to hold them in operative relation to said tube and transmit torque therebetween.

2. A cutter reel for rotary mowers which comprises a tubular axle, accurately preformed stub-shaft members of hard metal inserted into the ends of the tube, each stub-shaft having narrow longitudinal ridges the outermost surfaces of said ridges lying in a common geometrical surface of revolution, the diameter of which, at least at a distance from its ends, is slightly greater than that of the interior of the tubular axle between said ridges, said ridges engaging the inside of said tube and being in driving engagement for transmitting torque with the tube, a plurality of fly knives secured about said shaft, and bearings for said reel having their bearing surfaces accurately coaxial with said stub-shaft inserts.

3. A reel as defined in claim 2, in which the tube has bearing surfaces accurately machined coaxial with the preformed members, and is provided with bearings fitted onto said surfaces.

4. In a rotary reel mower, the combination with the reel having an axle of stock shafting, a bearing at each end thereof including a member of hard metal having a smooth surface of accurate dimensions for a bearing surface and another surface thereof coaxial with said bearing surface interfitting with the end of said shafting, and having projections harder than said shafting extending beyond the normal surface of said shafting and implanted in the softer metal of said shafting, establishing thereby a rigid connection without play due to clearance and capable of transmitting driving torque to the reel, and means for applying the torque for driving the reel to said axle through said hard member.

RICHARD D. CLEMSON.